US008304061B2

(12) United States Patent
Feldman et al.

(10) Patent No.: US 8,304,061 B2
(45) Date of Patent: Nov. 6, 2012

(54) LAMINATED IDENTIFICATION DOCUMENT

(75) Inventors: Josef Feldman, Teaneck, NJ (US);
Anatoly Lipkin, Pomona, NY (US);
Mark M. Persinko, Manville, NJ (US)

(73) Assignee: Josef Feldman, Teaneck, NJ (US)

( * ) Notice: Subject to any disclaimer, the term of this patent is extended or adjusted under 35 U.S.C. 154(b) by 1180 days.

(21) Appl. No.: 11/982,823

(22) Filed: Nov. 5, 2007

(65) Prior Publication Data

US 2008/0106002 A1    May 8, 2008

Related U.S. Application Data

(60) Provisional application No. 60/857,031, filed on Nov. 6, 2006.

(51) Int. Cl.
*B32B 37/00* (2006.01)
(52) U.S. Cl. ............... 428/195.1; 428/98; 283/74
(58) Field of Classification Search ............... 428/195.1
See application file for complete search history.

(56) References Cited

U.S. PATENT DOCUMENTS

| | | | |
|---|---|---|---|
| 5,334,573 | A | 8/1994 | Schild |
| 5,532,292 | A | 7/1996 | Wainwright et al. |
| 5,783,024 | A | 7/1998 | Forkert |
| 6,003,581 | A | 12/1999 | Aihara |
| 6,007,660 | A | 12/1999 | Forkert |
| 6,066,594 | A | 5/2000 | Gunn et al. |
| 6,090,529 | A * | 7/2000 | Gelbart ............... 430/306 |
| 6,130,270 | A | 10/2000 | Ukon et al. |
| 6,159,327 | A | 12/2000 | Forkert |
| 6,283,188 | B1 | 9/2001 | Maynard et al. |
| 6,342,335 | B1 | 1/2002 | Fujita et al. |
| 6,343,138 | B1 | 1/2002 | Rhoads |
| 6,404,643 | B1 | 6/2002 | Chung |
| 6,517,921 | B2 | 2/2003 | Ulrich et al. |

(Continued)

FOREIGN PATENT DOCUMENTS

EP    1 698 485 A2    9/2006

(Continued)

OTHER PUBLICATIONS

International Card Manufacturers Association (ICMA) website (www.icma.org), Section 5—The Basics of Card Manufacturing. This entire document is attached hereto as Exhibit A. Date: unknown, but at least as early as Nov. 6, 2006.

(Continued)

*Primary Examiner* — Mark Ruthkosky
*Assistant Examiner* — Ian Rummel
(74) *Attorney, Agent, or Firm* — Michael E. Zall

(57) ABSTRACT

A laminated identification document having a plurality of laminate layers and an identification image thereon. The document has a core laminate layer having an upper surface and lower surface, at least one surface of which is printed with a dot matrix pattern and at least one visually opaque or reflective laminate layer bonded to and overlaying the printed surface. Upon pitting the laminate layer portions, the dot matrix pattern printed on the core laminate is expossed to thereby form the identifying image.

A laser markable laminated identification document having a plurality of laminate layers wherein a compatibilizing layer is bonded to adjoining laminate layers, the compatibilizing layer includes an imaging material that can be laser marked.

A laminated identification document having a plurality of laminate layers and an identification image thereon, wherein at least one laminate layer is a compatibilizing layer.

17 Claims, 3 Drawing Sheets

U.S. PATENT DOCUMENTS

| | | | |
|---|---|---|---|
| 6,843,422 B2 | 1/2005 | Jones et al. | |
| 6,846,536 B1 | 1/2005 | Priesnitz et al. | |
| 6,905,742 B2 | 6/2005 | Koneripalli et al. | |
| 7,040,981 B2 | 5/2006 | Iliescu | |
| 7,215,625 B2 | 5/2007 | Yamamoto | |
| 7,463,154 B2 | 12/2008 | Cortina et al. | |
| 2002/0140557 A1 | 10/2002 | Dukler et al. | |
| 2003/0124451 A1* | 7/2003 | Camillus et al. | 430/138 |
| 2005/0001419 A1 | 1/2005 | Levy et al. | |
| 2006/0028974 A1 | 2/2006 | Mori et al. | |
| 2006/0068316 A1* | 3/2006 | Engel et al. | 430/270.1 |
| 2006/0141391 A1* | 6/2006 | Klein et al. | 430/270.1 |
| 2006/0251869 A1* | 11/2006 | Herslow | 428/204 |
| 2010/0290039 A1* | 11/2010 | Endres et al. | 356/237.1 |

FOREIGN PATENT DOCUMENTS

WO    WO 2005048182 A1 *   5/2005

OTHER PUBLICATIONS

ISO/IEC 10373-2003 Identification Card Test Methods and ANSI INCITS 322-2002 Card Durability Test Methods. Exhibit C; date: Jun. 10, 2002.

ANSI International Standard ISO/IEC 10373:1993(E), Exhibit B. Date: Dec. 15, 1993.

Evaulating Environmental Stress Cracking of Medical Plastics (MPB archive, May 1998), Exhibit D.

Printing Technology (Fifth Edition) J. Michael Adams and Penny Ann Dolin, Copyright 2002, Chapter 5, p. 93-105.

* cited by examiner

| Typical Card Structure | |
|---|---|
| Process | Typical Function |

Milled Chip Cavity
- = 1. Cold Emboss
- = 2. Compatibiliser
- = 3. Foil
- = 4. Compatibiliser
- = 5. Transfer Print
- = 6. Hot Stamp
- = 7. Compatibiliser
- = 8. Overlay
- = 9. Compatibiliser
- = 10. Overlay
- = 11. Compatibiliser
- = 12. Ink
- = 13. Compatibiliser
- = 14. Ink
- = 15. Compatibiliser
- = 16. Ink Group
- = 17. Compatibiliser
- = 18. Inlay
- = 19. Compatibiliser
- = 20. Core
- = 21. Compatibiliser
- = 22. Inlay
- = 23. Compatibiliser
- = 24. Core
- = 25. Compatibiliser
- = 26. Overlay
- = 27. Compatibiliser
- = 28. Inlay
- = 29. Compatibiliser
- = 30. Ink
- = 31. Compatibiliser
- = 32. Ink
- = 33. Compatibiliser
- = 34. Ink
- = 35. Compatibiliser
- = 36. Overlay
- = 37. Compatibiliser
- = 38. Overlay
- = 39. Compatibiliser
- = 40. Hot Stamp
- = 41. Transfer Print
- = 42. Cold Emboss
- = 43. Mag Stripe

FIG. 1-1

| | Typical Card Structure | |
|---|---|---|
| | Process | Typical Function |
| | 44. Milled Chip Cavity with Compatibilising Adhesive on the Bottom of Cavity | |
| | = 1. Cold Emboss | Positive Emboss |
| | = 2. Compatibiliser | Adhesion |
| | = 3. Foil | Reflective Foil |
| | = 4. Compatibiliser | Protective Coating |
| | = 5. Transfer Print | D2T2 - Black Resin |
| | = 6. Hot Stamp | Holographic / Decorative |
| | = 7. Compatibiliser | Abrasion Resistance / Transfer + D2T2 Print Receptor |
| | = 8. Overlay | Protection / Security - Transparent |
| | = 9. Compatibiliser | Adhesion |
| | = 10. Overlay | Holographic Decorative |
| | = 11. Compatibiliser | Adhesion / Ink Receptor |
| | = 12. Ink | Decorative / Security or OVD |
| | = 13. Compatibiliser | Adhesion / Smoothing Layer / Surface Tension Adjustment |
| | = 14. Ink | Decorative / Data |
| | = 15. Compatibiliser | Adhesion / Smoothing Layer / Surface Tension Adjustment |
| | = 16. Ink Group | Decorative / Data |
| | = 17. Compatibiliser | Compatibilisation |
| | = 18. Inlay | Security / Decorative |
| | = 19. Compatibiliser | Priming layer / Roughing Layer / Surface Tension Adjustment |
| | = 20. Core | Stiffness / Flex / Impact / Opaque or Transparent |
| | = 21. Compatibiliser | Adhesion / White Colorant |
| | = 22. Inlay | RF Antenna / Chip |
| | = 23. Compatibiliser | Adhesion / White Colorant |
| | = 24. Core | Stiffness / Flex / Impact / Opaque or Transparent |
| | = 25. Compatibiliser | Adhesion / White Colorant |
| | = 26. Overlay | Protection / Security - Transparent |
| | = 27. Compatibiliser | Priming Layer / Roughing Layer / Surface Tension Adjustment |
| | = 28. Inlay | Security / Decorative |
| | = 29. Compatibiliser | Compatabilisation |
| | = 30. Ink | Decorative |
| | = 31. Compatibiliser | Adhesion / Smoothing Layer / Surface Tension Adjustment |
| | = 32. Ink | Decorative |
| | = 33. Compatibiliser | Adhesion / Smoothing Layer / Surface Tension Adjustment |
| | = 34. Ink | Decorative / Security or OVD |
| | = 35. Compatibiliser | Adhesion / Smoothing Layer / Surface Tension Adjustment |
| | = 36. Overlay | Protection / Security - Transparent |
| | = 37. Compatibiliser | Abrasion Resistance / Transfer Print Receptor |
| | = 38. Overlay | Protection / Security - Transparent |
| | = 39. Compatibiliser | Receptor / Compatibiliser |
| | = 40. Hot Stamp | Holographic / Decorative |
| | = 41. Transfer Print | D2T2 - Black Resin |
| | = 42. Cold Emboss | Negative Emboss |
| | = 43. Mag Stripe | |

FIG. 1-2

LAMINATED IDENTIFICATION DOCUMENT

RELATED APPLICATIONS

This application claims priority of provisional application U.S. Ser. No. 60/857,031 filed on Nov. 6, 2006.

SPECIFICATION

1. Field of the Invention

The present invention relates to laminated documents that are required to be secure. More particularly, it relates to the laminated identification documents, passports, and smart cards and other similar type security documents.

2. Background of the Invention

Verifying one's true identity is an ever-increasing problem. Identity theft is rampant, and stolen identities have even been used to facilitate terrorist attacks. Computer networks and secure areas have been breached with misappropriated keys, passwords and codes.

One conventional solution typically includes an identification document having a biometric indicium such as a photographic image or fingerprint of the authorized holder on the document protected from tampering by one or more security features.

Another solution is what is called a smart card or a smart passport. A typical smart card consists of a core layer that is preferably preprinted, for example, with personal information. Such preprinting of the core is typically done prior to the insertion or installation of a smart card module. If required, high quality images and text may be printed on both sides of the core. The printed core is then preferably covered with a laminate that protects the preprinted core with protection from intrusion and protects it from the everyday wear-and-tear that occurs with use. Subsequently a cavity is formed in the laminated structure and an integrated circuitry module is secured in the cavity. Antenna connected to the smart card chip are sometimes imbedded into cards to allow communications by radio frequency.

U.S. Pat. No. 6,843,422 to Jones et al broadly describes the current practices of manufacturing contactless and contact smart documents for delayed issuance and distribution from a central location and immediate issuance and distribution from an over-the-counter location. The practices described in Jones et al are also used in manufacturing other laminated indicia bearing articles. The entire disclosure of Jones et al is incorporated herein by reference.

For security reasons it is important that an identification card issued from a central location and from a decentralized over-the-counter location have the same functionality and appearance. The manufacture of cards that meet the ISO specifications involves many manufacturing steps. Therefore, the card bodies are generally manufactured in a central location and then personalized at a later time in a decentralized location. Personalization of printing is generally done by Dye diffusion Thermal Transfer (D2T2) or laser engraving. The D2T2 printed cards are generally not durable enough for long life identity cards while the laser engraved cards are generally a one color print on a contrasting background. It is therefore desirable to be able to print a multicolored personalized image on finished cards that meet the physical requirements of the ISO specifications.

Jones et al also describes printing and laminating an identification document wherein the core is based on a microporous synthetic paper. Such an identification document may also be a smart card that includes integrated circuitry, e.g., a semiconductor chip and interface. The card may also be printed with identification indicia or other images by laser, thermal transfer and/or offset printing methods, and include, for example, photographic images, and/or customized or personalized text and data. Microporous materials are easier to print and laminate because the layers of ink and polymer used, for example, for lamination can partially flow into the micropores of the material. This helps bond the ink and laminate to the core structure to achieve a more secure document than can be achieved with a nonporous polymer core. The microporous core materials, such as Teslin® synthetic paper, however have some physical disadvantages in that it is structurally weaker than solid core materials and as a thermoplastic is easier to delaminate under heat. It would therefore be desirable to use a solid core but still have good printability while retaining a strong laminate structure.

Basic card manufacturing processes are also described in the International Card Manufacturers Association (ICMA) website (www.icma.org), Section 5—*The Basics of Card Manufacturing*. This entire document is incorporated herein by reference.

Standard test methods for identification cards are described in *ISO/IEC* 10373-2003 *Identification Card Test Methods* and *ANSI INCITS* 322-2002 *Card Durability Test Methods*. The entire disclosures of these documents are incorporated herein by reference.

Jones et al enumerates additional deficiencies and problems associated with conventional smart cards. In the case of contact smart cards, some of these problems include the smart card module popping off the card when flexed, flex stresses that damage the smart card module, and/or the card itself cracking with normal wear and tear.

Various lamination processes for identification cards are disclosed in U.S. Pat. Nos. 5,783,024, 6,007,660, 6,066,594, 6,159,327, 6,283,188 and 6,003,581. The entire disclosures of these patents are incorporated herein by reference.

Jones et al indicates that it's most preferred laminate is a polycarbonate. Polycarbonate is a high melting point stiff polymer that can compensate for the flexible Teslin®. However, Polycarbonate is expensive, cannot be embossed and unless it is coated, is very sensitive to notch impact failure. This means that if the surface is scratched, it can crack through the scratch. Jones et al describes coating the polycarbonate with a receptor coating for dye diffusion thermal transfer (D2T2) citing U.S. Pat. Nos. 6,066,594 to Gunn and 5,334,573 to Schild. Jones et al does not teach or suggest these receptor coatings to be impact modifying layers to reduce the notch sensitivity of Polycarbonate. A disadvantage of the Gunn and Schild coatings is that they are solvent-based coatings that include aggressive organic solvents and additionally are undesirable for environmental and work safety issues. Some of the solvents in these solvent-based coatings are known solvents for polycarbonate and PET that can cause crazing that can lead to crack formation in the polymer film, see for example, *Evaluating Environmental Stress Cracking of Medical Plastics* (MPB archive, May 98). Thus, it is generally undesirable to use solvent systems in these type applications. Extrusion of the Gunn and Schild coatings is possible but the materials need to be thermoplastic and such materials, because they stay thermoplastic, can be subject to removal, i.e., tampering, by thermal means.

Polycarbonate's main attraction as a transparent overlaminate is that it is available from suppliers like Bayer, Germany in laser markable grades. This allows permanent burn indicia to be made into the polymer to be made. Such burn indicium makes alteration of data difficult or impossible to accomplish. Such a solution, does not address the notch sensitivity of Polycarbonate and the possibility of cracking, nor does it address the need for OTC personalization in color using dye diffusion thermal transfer D2T2. Pure Polycarbonate does not accept standard D2T2 printing.

Jones et al further describes the use of various adhesive layers AD1-3 but does not differentiate between thermoplastic and thermoset materials. One adhesive material (e.g., Jones et al layers 11 and 13, FIG. 1) can include, e.g., KRTY (Transilwrap, Franklin Park, Ill.). KRTY is a polyolefin thermoplastic adhesive. Also cited is a thermoplastic polyurethane (e.g., CLA93A from Thermedics, Inc.)

U.S. Pat. No. 6,905,742 to Konerpalle addressed the problem of card body lamination and personalization with ID indicia. Konerpalle describes extrusion laminating a porous ink receptor synthetic layer, such as porous Teslin, to a stiffer Polypropylene core composition using thermoplastic adhesive compatibilizing materials such as ELVAX 3175 ethylene vinyl acetate polymer, and BYNEL 3101 acid/acrylate-modified ethylene vinyl acetate polymer, ELVALOY 741 resin modifier, and FUSABOND polymeric coupling agent (E.I. DuPont de Nemours and Company, Wilmington, Del.). The Konerpalle laminate structures are based on materials that are thermoplastic and are adhered together with thermoplastic materials, no mention of thermoset materials is made.

All of the foregoing references describe security documents produced by laminating and bonding the structure together by thermal means using thermoplastic materials attached to each other and/or using thermoplastic adhesives. Such materials tend to have melt points between 80°-170° C. Such thermoplastic polymers can be easily and repeatedly softened and hardened by applying heat and then cooling. Making laminates from such materials are subject to thermal delamination. Such a characteristic makes security documents made from such materials highly susceptible to security breaches and tampering.

Jones et al and Konerpalle each focus on the necessity of having a porous print surface both to accept printed indicia as well as to ensure proper lamination of the structure that can include a porous scrim as the RF antenna/chip carrier.

There are thus serious deficiencies in the current structures involving susceptibility to thermal delamination and weakening of the physical structure by using solvent-based processes.

Laser engraving or marking has advanced in recent years. U.S. Pat. No. 6,342,335 to Fujita discusses advances in laser technology systems of image recording utilizing laser beams for implementing high-speed recording or high-density, high-image-quality recording. Image forming systems using laser heat-sensitive recording materials or laser thermal transfer recording materials for recording systems in which a laser beam is converted to heat. The entire disclosure of Fujita et al is incorporated herein by reference.

There also exists technology for writing a CD or DVD which achieves marks by making pits with varying reflectivity. U.S. Pat. No. 7,215,625 to Yamamoto describes an optical disk recording apparatus that records a visible image on an optical disk by using a laser to form larger pits than those normally used for digital recording, thereby changing the reflectivity and allowing a visible image to be recorded. The entire disclosure of Yamamoto et al is incorporated herein by reference. There is no teaching or suggestion of using laser engraving of pits to form a black and white or a colored image in the visible region of the spectrum or any application to security documents.

OBJECTS AND SUMMARY OF THE INVENTION

It is an object of this invention to use compatibilizing imaging materials that can be laser marked at lower power densities (less than one watt/micron) and still have very high cohesive strength. Thus by reducing the explosive laser force and increasing the cohesive strength of the compatibilised structure, one can create laser markable robust card and CD structures that will not delaminate or redeposit material in unwanted areas.

Another object of this invention is to provide a compatibilized layer or layers between laminates in an identification card structure wherein such compatibilised layer can be partially or fully thermoset.

It is a further object of this invention to provide a compatibilized layer or layers between laminates in an identification card structure that comprises a water based, and/or radiation curable material that is environmentally acceptable.

It is a further object of this invention, through the use of such compatibilized layer or layers in an identification card structure, to remedy certain problems associated with such card structures, in particular, the minimization or prevention of flex stresses that damage the card and/or the prevention of the card itself from cracking due to normal wear and tear.

It is a further object of this invention, through the use of such compatibilized layer or layers that replace the conventional chip adhesive in a smart card to prevent the smart card module from popping off the card when flexed, to minimize or prevent flex stresses that damage the card and/or to prevent the card itself from cracking due to normal wear and tear.

It is yet another object of this invention, through the use of such compatibilized layer or layers, to overcome the problems associated with the use of solvent systems that have aggressive organic solvents that cause crazing and lead to crack formation in the polymer film and are undesirable for environmental and work safety issues.

It is still another object of this invention, through the use of such compatibilized layer or layers, to obtain an identification card that has transparency in the visible region of 400-800 nm and has absorbency for a laser wavelength to permit marking of the transparent coated or laminated white or clear core with indica such as bar codes, photos and other biometric or data containing indicia.

It is still another object of this invention, through the use of such compatibilized layer or layers, to obtain an identification card that has transparency or opacity or reflectivity in the visible region of 400-800 nm and has absorbency for a laser wavelength to permit marking of the opaque or reflective coated or laminated white or clear core with multicolored indica such as bar codes, photos and other biometric or data containing indicia. Preferably, the recording media is a metallic layer and the metallic layer does not interfere with the transmission of RF data to the antenna of a contactless card.

It is still another object of this invention, through the use of such compatibilized layer or layers, to obtain an identification card that has a high reflectivity in the visible region of 400-800 nm and has absorbency for a laser wavelength to permit marking of the opaque or reflective coated or laminated white or clear core with multi colored indica such as bar codes, photos and other biometric or data containing indicia. Preferably, the recording media is an opaque or partially opaque layer that can be made transparent through exposure to laser energy such as: a foamed layer that when heated causes the collapse of the foam into a solid transmissive layer a crystalline or semicrystalline or liquid crystalline layer light scattering layer that is changed to transparent on exposure to laser light or other radiation.

It is still another object of this invention, through the use of such compatibilized layer or layers, to obtain an identification card that has a high reflectivity in the visible region of 400-800 nm and has absorbency for a laser wavelength to permit marking of the opaque or reflective coated or laminated white or clear core with multi colored indica such as bar codes, photos and other biometric or data containing indicia. Preferably, the recording media is a holographic metallic layer and the imaging creates discontinuities in the metallic layer and does not interfere with the transmission of RF data to the antenna of a contactless card. The Holographic material may have tracks to help guide the LD write/read control mechanism similar to CD or DVD writing materials.

All of the foregoing objects are achieved by the processes and structures of this invention.

In one embodiment there is provided a process for recording a predetermined identification image on a laminated identification document having a plurality of laminate layers. The process comprises providing a laminated identification document that includes a core laminate layer having an upper surface and lower surface, at least one surface of which is printed with a dot matrix pattern. Additionally, at least one visually opaque or reflective laminate layer is bonded to and overlaying the printed surface. The opaque or reflective laminate layer is then pitted to enable portions of the dot matrix pattern printed on the core laminate to be exposed to thereby form the identifying image.

In another embodiment of this invention there is provided a laser markable laminated identification document having a plurality of laminate layers. The identification document comprises a compatibilizing layer bonded to adjoining laminate layers, the compatibilizing layer includes an imaging material that can be laser marked at power densities less than about one watt/micron and maintain cohesive bonding with the adjoining layers to thereby form a laser markable identification card.

In yet another embodiment of this invention there is provided a laminated identification document having a plurality of laminate layers and an identification image thereon. The document comprises a core laminate layer having an upper surface and lower surface, at least one surface of which is printed with a dot matrix pattern. Additionally, there is provided at least one visually opaque or reflective laminate layer bonded to and overlaying the printed surface. Upon pitting the laminate layer portions, the dot matrix pattern printed on the core laminate are exposed to thereby form the identifying image.

In still another embodiment of this invention there is provided a laminated identification document having a plurality of laminate layers and an identification image thereon, wherein at least one laminate layer is a compatibilizing layer.

BRIEF DESCRIPTION OF THE DRAWINGS

Further aspects, features and advantages of the present invention will become even more apparent with reference to the following detailed description and the accompanying drawings.

FIG. 1.1 is a cross sectional view of an exemplary identification document including a document core.

FIG. 1.2 is a cross sectional view of an exemplary identification document including a document core and includes representative functions of the various layers.

Figure 2:
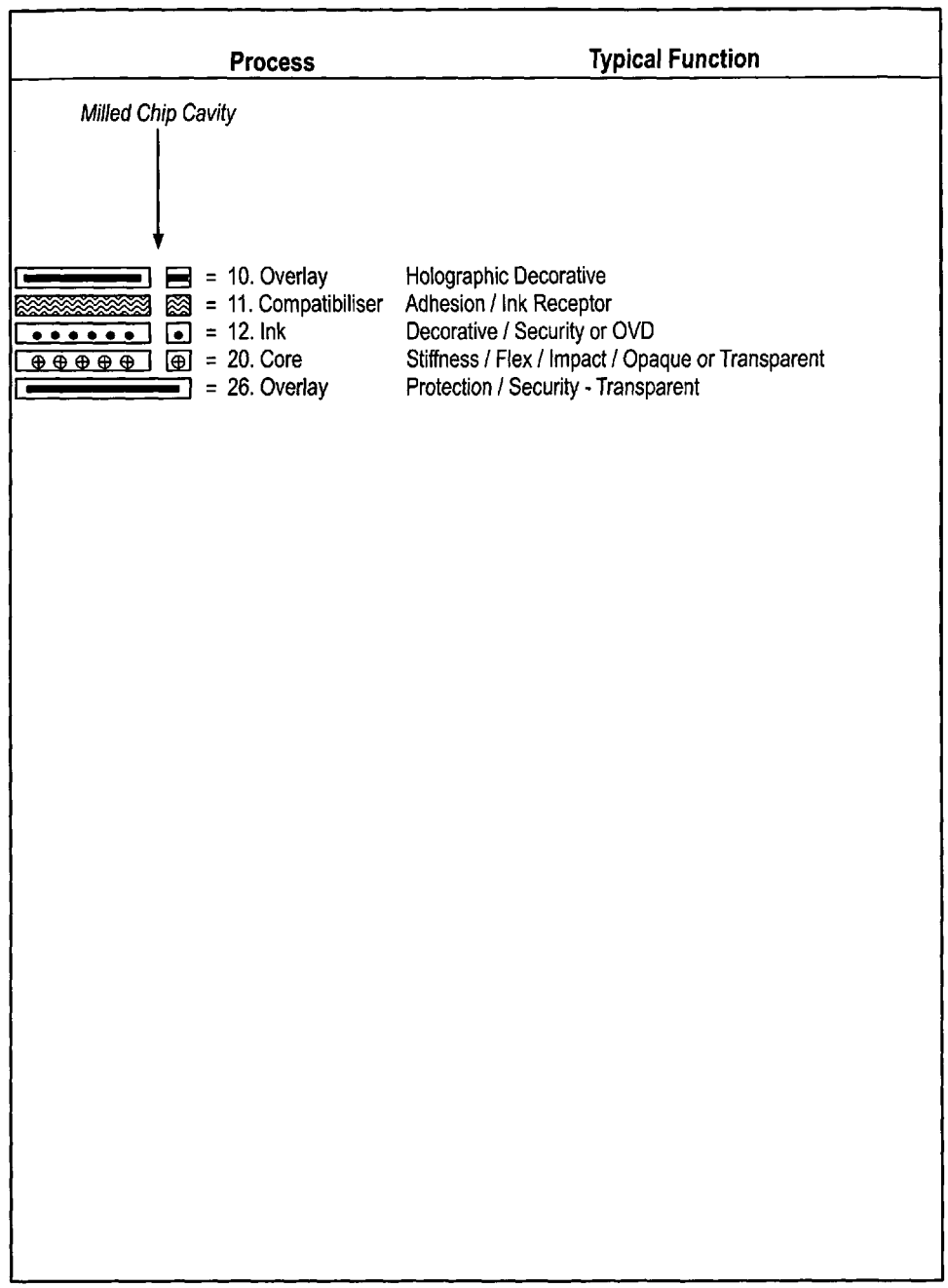

The cross sectional view and functions are only exemplary and other uses or combinations will be apparent to those skilled in the art.

FIG. 2 is a cross section of a test structure simplified from FIG. 1 to allow testing of the functionality of the compatibilizing layer embodied by this invention.

Of course, the drawings are not necessarily presented to scale, with emphasis rather being placed upon illustrating the principles of the invention. In the drawings, like reference numbers indicate like elements.

DETAILED DESCRIPTION OF THE INVENTION

This invention is directed to an identification document upon which optically recorded images can be produced. The apparatus used to produce such images includes an optical pickup, an image encoder that generates data corresponding to a visual image to be drawn in a recording region of the document, a Laser Density, LD, control unit that controls the optical pickup and records pits in the identification document. The pits are engraved in the visually opaque and/or reflective recording media that forms the top layer of the identification document, the pits being in register with color dots that are located below the top layer. Thus when a pit is formed it allows the colored dot below to become visible thereby forming the visual image in the document. The color dots may be printed below the imaging layer as full screen dots in the usual CMYK, (Hexachrome™ Pantone Corp.,) CMYKOG (Opaltone™ Opaltone Inc.) CMYKR'G'B' printing systems. Multicolor printing is briefly described in *Printing Technology*, by J. Michael Adams et. al, Delmar Thomson Learning 2002, Chapter 5. The entire disclosure of Adams et. al is incorporated herein by reference.

A system controller determines whether reproducible data are stored in the recording region of the identification document and records the visual image by controlling the LD control unit. Visible pits are formed revealing the dots of the printed matrix below. The wavelength and reflective ratio of the region where the long pits are formed changes and the region becomes visible to a user. Accordingly, in addition to digital data, any characters and figures designated by an external device can be visibly recorded in color on the data recording surface of an identity card.

Additionally, the areas of the imaging material (lands) that have not been punctured by long pits can still be used for digital recording in the conventional manner. Thus for example a photograph or bar code, or other biometric information can be recorded, in the same media, in both visual color (using long or large pits) and redundantly digitally recorded in the land area surrounding the area where a color dot has been printed (using conventional sized recording pits). It is even possible to read the long pits and record them as data.

Further, when the recording media is metallic such as aluminum, copper or other conducting or semiconducting material, the land areas of the imaging material that remain form an antennae with a particular electromagnetic signature when probed by RF radiation. Electromagnetic signatures are used in the manufacture of UHF Static RFID labels such as those made by Avery Dennison Corporation or Omron Corporation. By laser burning a suitable pattern in the conducting imaging layer information can be encoded that is RF readable. This would allow triple redundancy of information in the card structure: Visual ID, Optical Memory and RF ID.

In addition the LD control unit can be designed to read the RF information as well as the color visual image created by the larger pits. For example a white LED light source with a color detector for Opaltone® CMYKR'G'B' ink dots. This would allow, in addition to the typical 0 or 1 digital recording, the recording of multiple states 0-7 in the case of Opaltone CMYKR'G'B' printing. With 0 being no recording 1 for C, 2 for M, 3 for Y etc. The additional 3+ factor increase in memory capacity of multiple on-off states could be used to offset the loss of memory capacity by using larger pits. In any case for identity cards, the memory requirements are rather small and can easily be accommodated in a conventional 0-1 recording methodology.

In addition, images with visible colors of CMYK can be printed in a conventional manner giving a static indicium made of subtractive colors. For example, a state seal. The R'G'B' dots are interspersed with the static image and can be personalized with the laser to give for example indicia consisting of a personal photo. The RGB dots can be supplanted with dots of colors that are only detectible when exposed to radiation that is outside of the visible spectrum such as UV or IR radiation that exposes fluorescent or phosphorescent ink dots. The fluorescent or phosphorescent ink dots act as a security marker. This card with security dots can now have a personalized security indicium. For example, an individual's personal identity number or bar code. It is now also possible to personalize a security indicium over the counter in a similar manner as the central issue card.

When engraving with a laser, it is usually desirable to protect the engraved area to prevent tampering and ensure the long life of the mark. It is therefore desirable to focus the laser below the surface. The explosive force of the energy absorption of this process can be very high (multiple watts/square micron). This high force can cause delamination in the structure of the laminate. The exploding material can redeposit onto the substrate causing defects to the image or defects to the antennae. It is therefore desirable to use stiff materials which can resist the explosive force of laser engraving while still maintaining cohesive structural integrity.

This invention uses compatibilizing imaging materials that can be laser marked at lower power densities (less than one watt/micron) and still have very high cohesive strength. Thus by reducing the explosive laser force and increasing the cohesive strength of the compatibilised structure, one can create a laser markable robust identity card structure that will not delaminate or redeposit material in unwanted areas.

The compatibilized layer or layers are used between laminates in an identification card structure. More particularly, such compatibilised layer can be partially or fully thermoset. It is preferable for environmental and structural reasons that this layer comprises a water based, and/or radiation curable material.

The use of such compatibilized layer or layers in an identification card structure minimizes or prevents flex stresses that damage the card and/or that prevents the card itself from cracking due to normal wear and tear. Such layers can replace the conventional chip adhesive in a smart card, to prevent the smart card module from popping off the card when flexed.

The compatibilized layer or layers overcome the problems associated with the use of solvent systems that have aggressive organic solvents that cause crazing and lead to crack formation in the polymer film and are undesirable for environmental and work safety issues.

The compatibilized layer or layers in the identification card can provide a card that has transparency in the visible region of 400-800 nm and has absorbency for a laser wavelength to permit marking of the transparent coated or laminated white or clear core with indica such as bar codes, photos and other biometric or data containing indicia. Additionally, the compatibilized layer or layers can provide an identification card that has transparency or opacity or reflectivity in the visible region of 400-800 nm and has absorbency for a laser wavelength to permit marking of the opaque or reflectively coated or laminated white or clear core with multicolored indica such as bar codes, photos and other biometric or data containing indicia. Additionally, if the recording media is a metallic layer, the metallic layer does not interfere with the transmission of RF data to the antenna of a contactless card and the metallic layer itself can act as an antenna label that has a unique signature in response to RF radiation.

Optionally, the recording media is an opaque or a partially opaque layer that can be made transparent through exposure to laser energy, for example a foamed layer that when heated causes the collapse of the foam into a solid transmissive layer, e.g., a crystalline, semicrystalline or liquid crystalline light scattering layer that is changed to a transparent layer upon exposure to laser light or other radiation.

The recording media may also be a holographic metallic layer and the imaging creates discontinuities in a holographic metallic layer that does not interfere with the transmission of RF data to the antenna of a contactless card. The Holographic material may have tracks to help guide the LD write/read control mechanism similar to CD or DVD writing materials.

As used herein the terms identification document and ID document are intended to include all types of identification documents. Additionally, as used herein, the terms document, card, badge, and documentation are used interchangeably. In addition, identification documents and ID documents are broadly defined herein to include, but are not limited to, documents, magnetic disks, credit cards, bank cards, phone cards, passports, driver's licenses, network access cards, employee badges, tokens, fobs, debit cards, security cards, visas, immigration documentation, national ID cards, citizenship cards, social security cards and badges, certificates, identification cards or documents, voter registration cards, police ID cards, border crossing cards, security clearance badges and cards, gun permits, badges, gift certificates or cards, membership cards or badges, tags, CD's, DVD's and consumer products such, as knobs, keyboards, electronic components, etc., or any other suitable items or articles that may record information, images, and/or other data, which may be associated with a person or brand identity, function and/or an object or other entity to be identified that requires a certain level of security and tamper resistance.

Further, as used herein, identification includes, but is not limited to, information, decoration, and any other purpose for which an indicium can be placed upon an article in the article's raw, partially prepared, or final state.

Although this invention's primary use is for security identification documents and cards, it may be additionally used in product tags, product packaging, business cards, bags, charts, maps, labels, etc. particularly those items including a laminate or over-laminate structure. The term "identification document" is thus broadly defined herein to include these tags, labels, packaging, cards, etc.

As used herein, a thermoset material or polymer is a plastic material that will undergo or has already undergone a chemical reaction, such as crosslinking, through heat, radiation or catalysts to form a solid. Once the material has gone through its reaction, it does not go back to its original state and does not flow when reheated. The thermoset reaction may be a chemical reaction or a crosslinking reaction induced by thermal means, radiation, a catalyst or other means. Pure thermoset materials are generally rigid, but rubber elastic thermosets are well known.

In one of many aspects of this invention herein, there has been developed a compatibilizing material system that includes a thermoset material that retains flexibility; the materials being flexible and sufficiently thermoset to be resistant to thermal delamination while providing adhesiveness to a variety of films and indicia material used in identification structures. After thermal lamination, identification structures using the compatibilizing material system of this invention become very resistant to delamination and impart impact strength to the structure.

As used herein, the term compatible means to work together without conflict. Details on compatibilizer process and materials can be found in the book *Polymeric Compatibilizers, Use and Benefits in Polymer Blends* by Datta et al, Hanser Publishers 1996. The entire disclosure of Data et. al is incorporated herein by reference.

The compatibilizing layer as used in the laminates of this invention can have one or several functions, e.g., an adhesive for bonding layers together, a carrier of dyes and pigments to make inks and colored coatings, for decorative or data carrying purposes such as biometric data (photographs, bar codes, fingerprints) with good adhesion to the layer above or below, a carrier of security dyes and pigments such as holographic, pearlescent, and metallic pigments to make inks and colored coatings with good adhesion to the layer above or below, an impact modifying coating, a print surface leveling agent as high resolution printing can usually not be done on rough surfaces, a surface tension modifying layer, to allow polymer or ink layers to come in good contact with each other, and as receptor coating for receiving indicia.

The compatabilising layers used in this invention, can be applied as a coating or as indicia by gravure, flexography, serigraphy, reprography both liquid and solid toner based, inkjet, and as extrusion polymers or hot melts. Laminates made with the compatabilizing layers of this invention are much less subject to thermal delamination because of their primarily thermoset nature. Laminates made with these materials perform well in the industry ISO tests.

One aspect of this invention is directed to a method of producing an identification document by providing a first laminate, a second laminate, and a compatibilizing layer and then laminating them together with the compatibilizing layer therebetween.

Another aspect of this invention is directed to a method of producing a smart identification card that includes the steps of:

providing a first laminate and a second laminate, the first laminate having a front surface and a back surface, and the second laminate having a front surface and a back surface;

adjacently arranging an adhesive with the back surface of the first laminate;

adjacently arranging a compatibilizing layer with the back surface of the second laminate;

providing a core having a top surface and a bottom surface;

laminating the first laminate, adhesive layer, core, compatibilizing layer and second laminate to form a structure;

machining a portion of the structure; and providing an integrated circuitry module in the machined portion of the structure, the integrated circuitry module providing at least some smart card functionality.

Still another aspect of the present invention includes an identification document including:

a first transparent polymer, e.g., PET (polyethylene terephthalate) film including a top surface and a bottom surface;

a second transparent polymer, e.g., PET, film including a top surface and a bottom surface;

an image-receiving layer provided on the first film top surface;

a compatibilizing layer in contact with the first film bottom surface and the second film top surface, the compatibilizing layer serving to secure the first film and the second film to one another.

The foregoing structures can be made with any combination of at least one of, a polymer, a synthetic or nonsynthetic paper, a polyolefin, a silica-filled polyolefin, polyvinyl chloride, polycarbonate, amorphous and biaxially oriented polyester terpthalate and polyester napthanate, glycol modified polyester, styrene, high impact polystyrene, acrylonitrile styrene butadiene, acrylic, polyketone, cellulose ester, polysulfone, polyamide, polycarbonate to itself or each other. The polymer may be a porous or nonporous synthetic material.

Still another aspect of the present invention provides a method of making a contactless smart identification document using the compatabilising layer of this invention. The method includes:

providing a carrier layer including at least an antenna and electronic circuitry, wherein the carrier comprises at least one permeable area;

arranging the carrier layer between a first contact layer and a second contact layer, and then securing the first contact layer and second contact layer to the carrier layer through at least one of heat and pressure so that at least a portion of one of the first contact layer and the second contact layer migrates into the carrier layer at the one permeable area; and providing first and second laminate layers over at least the first and second contact layers, respectively, wherein at least one of the layers is a compatabilizing layer.

For purposes of illustration, the following section will generally proceed with reference to contact-type smart cards (which are sometimes interchangeably referred to as a contact smart ID or identification document or a smart ID or identification document).

A preferred contact-type smart identification comprises a document core and fused or secured polymer laminates, at least one of which is a compatabilizing layer or laminate. The multi-layered identification document is provided with integrated circuitry to facilitate processing and/or memory storage. It should be appreciated, however, that the present invention is not so limited. Indeed, as those skilled in the art will appreciate, the inventive techniques can be applied to many other structures formed in many different ways. For example, contactless smart card modules can be suitably packaged, with such packages being disposed in a cavity created in a multilayered document structure of this invention.

FIG. 1 is a cross-sectional view of an identification document according to one aspect of the present invention. The identification (ID) document is used as the foundation for a smart identification document. Indicia, i.e., "information", can be provided (e.g., screen printed, offset printed, gravure printed, thermal transferred, provided via ink or laser jet printing, laser engraved, etc.) on the front and/or back surface of the cores or overlays. For example, the information may include variable information, which is information that is unique to a cardholder (e.g., name, birth date, age, sex, weight, address, biometric information, photograph, and/or signature, etc.). The information may also include so-called "fixed" information. Fixed information is generally thought of as that information which remains constant from card to card, such as issuing agency information, seal, and/or some types of security designs, etc. Additional information, e.g., optical variable devices, can be provided at various levels in the structure. Other security features that may be optionally presented on the smart identification document include, e.g., ghost images, microprinting, ultraviolet or infrared images, biometric information, etc. We can optionally provide a print receiver (e.g., an image-receiving layer) to help a core or laminate layer better receive printed or transferred information. (For example, see the D2T2 receivers discussed in the present patent document and in U.S. Pat. No. 6,066,594, which patent is incorporated herein by reference.)

There are many materials that may be used in the identification documents of this invention, by way of example, referring to FIG. 1, the core materials can include a porous synthetic such as TESLIN, other synthetic materials, polymer, composites, and/or polyolefin. TESLIN is a synthetic paper sold by PPG Industries, Inc. And can be provided in sheets, with multiple cores taken from each TESLIN sheet.

Porous as well as non porous materials may be used. The laminate (sometimes called an "lover laminate") may include (but is not limited to) film and sheet products. Laminates usable with at least some embodiments of the invention include those which contain substantially transparent polymers and/or substantially transparent compatibilizer layers which can function as adhesives, or which have substantially transparent polymers and/or substantially transparent adhesives as a part of their structure, e.g., as an extruded feature. In some of the embodiments of the present invention, the term "laminate" may include both the laminate and adhesive layers (e.g., FIG. 1 layers 8 and 9). Examples of usable laminates include polyester, polycarbonate, polystyrene, cellulose ester, polyolefin, polysulfone, or polyamide, etc. Laminates can be made using either an amorphous or biaxially oriented polymer as well. A laminate can comprise a plurality of separate laminate layers, for example a boundary layer and/or a film layer.

Referring to FIG. 1, layer 24, and other layers designated core polymer layers, these may be formed from any polymer, for example polyester, polystyrene, cellulose ester, polyolefin, polysulfone, or polyimide. Either an amorphous or biaxially oriented polymer may be used. However, the preferred polymers to use herein are polycarbonate, PET, and PVC. The polymer 24 may be colored, e.g., white, to help accentuate indicia provided. Alternatively compatabilising layers 23 and 25 may be white (see Example 4 herein).

One preferred implementation employs a polycarbonate, polyester, or PVC as the overlay polymer and UV cured acrylate copolymer as the compatibilizer. Of course, other materials can be used instead. If the adhesive layers include polyurethane, a chemistry generally based on isocyanates, a variety of monomers and different reactions and additives can be exploited for synthesis of polymeric materials with desired properties, such as flexibility, toughness, durability, adhesion, and UV-stability. Additionally, different polyurethane compounds can be applied in various layers to achieve desired properties.

The antenna/chip structure is preferably disposed or embedded between two cores FIG. 1, layers 20-24. Where 20 and 24 are scrims that have been saturated with compatibilizers 21 and 23 compositions (see Example 3 herein)

Waterbased and UV cured Multifunctional Compatibilizing Material

The properties of compatibilisers used herein can be tailored by combining:

C1—A soft somewhat elastic polymer component
C2—A hard rigid polymer component
C3—A radiation curing agent(UV, Visible, IR, E Beam, Microwave)
C4—A chemical reactive agent or sensitiser
C5—A thermal reactive agent
C6—Other additives to control the rheology stability and transfer characteristics of the ink or coating The compatibiliser may be in the form of a solvent based, water based, hot melt, or radiation curable composition. UV and Visible curable compositions are preferred because they cure quickly on commercially available equipment.

U.S. Pat. No. 6,890,625 to Sigel describes typical UV and radiation cured formulations for hard surface coatings. However, similar compositions can be formulated to be soft.

The UV-curable coating compositions used herein include one or more UV-curable components, typically a monomer or oligomer including ethylenic unsaturation, and one or more flatting agents. The compositions can also include one or more aqueous and/or organic solvents, reactive diluents, UV photoinitiators, cure altering agents and other optional components.

UV Curable Monomers

Any suitable monomer or oligomer that can form a coating layer when applied to a surface and UV-cured can be used as the compatabilising agent of this invention. Such monomers and oligomers are well known to those of skill in the art. In one embodiment, the oligomers are liquid at room temperature, highly branched, and have multi(meth)acrylate functionality. As used herein, term (meth)acrylate and its variants mean acrylate, methacrylate and mixtures thereof. Examples include polyester (meth)acrylates, polyurethane (meth)acrylates, polyester-urethane acrylates, acrylated epoxy, polyepoxides compounds and mixtures thereof. They may also include thiolene chemistry or mixtures of acrylate and thiolene chemistry. In one embodiment, the urethane acrylates are derived from aliphatic diisocyanates that give crosslink density and glass transition temperatures in the appropriate range for a compatibiliser.

In one embodiment, the resin structure includes one or more of a diisocyanate and/or isocyanurate structure, a polyester polyol, and a polyester that includes a hydroxy and an acrylyl functionality.

C3—UV Photoinitiators, Thermal Initiators and Cure Altering Agents ("Gloss Controlling Agents")

Photoinitiators can include benzophenone-type initiators, phosphine oxides, acetophenone derivatives, and cationic photoinitiators such as triaryl sulfonium salts and aryliodonium salts. In one embodiment, the photoinitiator is water-soluble. Examples include benzophenone; 4-methylbenzophenone; benzyl dimethyl ketal; diethoxy acetophenone; benzoin ethers; thioxanthones; 1-hydroxycyclohexyl phenyl ketone (Irgacure 184 from Ciba Corp); 2-hydroxy-2-methyl-1-phenol-propane-1-one; 4-(2-hydroxyethoxy)phenyl-(2-hydroxy-2-methylpropyl) ketone; 2,4,6-trimethylbenzoyl diphenylphosphine oxide; bis(2,6-dimethoxybenzoyl)-2,4,4-trimethylpentyl phosphine oxide; 2,2-dimethoxy-2-phenyl acetophenone; 2-benzyl-2-N,N-dimethylamino-1-(4-morpholinophenyl)-1-butanone; and 2-methyl-1-[4-(methylthio) phenyl]-2-morpholino propan-1-one.

In one embodiment, the photoinitiator is benzophenone, alone or in combination with other photoinitiators, photoactivators and/or photosensitizers. In another embodiment, free radical initiators that generate radicals upon exposure to heat rather than light ("thermal initiators"), for example, various peroxide initiators, can be used, alone or in combination with photoinitiators. Such thermal initiators are well known to those of skill in the art. In this case, heat or a combination of heat and UV irradiation may be employed in the first set of polymerization conditions.

Commercially available photoinitiators that can be used include Darocur 1173 (2-hydroxy-2-methyl-1-phenyl-propan-1-one), Irgacure 184 (1-hydroxycyclohexyl phenyl ketone), Darocur 4265 (50% 2-hydroxy-2-methyl-1-phenyl-1-one and 50% 2,4,6-trimethylbenzoyldiphenylphosphine oxide), Irgacure 907 (2-methyl-1-[4-(methylthio)phenyl]-2-morpholino propan-1-one), Irgacure 1700 (25% bis(2, 6-dimethoxybenzoyl)-2,4,-4-trimethylpentyl phosphine oxide and 75% 2-hydroxy-2-methyl-1-phenyl-propan-1- one), benzophenone, Irgacure 819 (BAPO phenyl bis(2,4,6-trimethylbenzoyl)-phosphine oxide), Lucrin (MAPO diphenyl(2,4,6-trimethylbenzoyl phosphine oxide), and Irgacure 651 (alpha, alpha-dimethoxy-alpha-phenyl acetophenone), each of which is commercially available from Ciba Geigy. Other intiators in the thixanthone chemical family such as ITX and CTX may be used by themselves or in combination with the afformentioned initiators.

C-5 Reactive Diluents

Examples of suitable reactive diluents include acrylated materials such as (meth)acrylic acid, isodecyl(meth)acrylate, N-vinyl formamide, isobornyl(meth)acrylate, tetraethylene glycol (meth)acrylate, tripropylene glycol (meth)acrylate, hexanediol di(meth)acrylate, ethoxylate bisphenol-A di(meth)acrylate, ethoxylated neopentyl glycol di(meth) acrylate, propoxylated neopentyl glycol di(meth)acrylate, ethoxylated tripropylene glycol di(meth)acrylate, glyceryl propoxylated tri(meth)acrylate, tris(2-hydroxy ethyl) isocyanurate tri(meth)acrylate, pentaerythritol tri(meth)acrylate, pentaerythritol tetra(meth)acrylate, dimethylol propane tri (meth)acrylate dipentaerythritol caprolactone acrylate,hydroxycaprolactone acrylate monohydroxypenta(meth)acrylate, trimethylol propane and tri(meth)acrylate and ethoxylated and propoxylated analogues thereof.

Ink binder/extender compositions are well known to those of skilled in the art. In one embodiment, the compatabilizing layer includes a polvinylacetate/polyvinyl chloride copolymer in a suitable organic solvent such as (Slink 0122, FM Group Inc.) Other hydroxy-modified vinyl chloride/vinylacetate resins can also be used. The compatabilizing layer can include acrylates or derivatives thereof, and other varnish systems that include combinations of acrylates and/or derivatives thereof and polyvinylidine chloride and/or polyvinylidine fluoride.

Resins forming the compatabilising layer are not particularly limited, and various types of resins such as binder resins, known in the art may be employed. Listed as representative examples of binder resins may be methyl polymethacrylate based acrylic resins, styrene based resins such as polystyrene and the like, vinyl chloride based resins such as polyvinyl chloride and the like, vinylidene chloride based resins such as polyvinylidene chloride, and the like, polyester based resins such as polyethylene terephthalate, and the like, cellulose based resins such as cellulose acetate, and the like, polyvinyl acetal based resins such as polyvinyl butyral, and the like, epoxy based resins, amide based resins, urethane based resins, melamine based resins, alkyd based resins, phenol based resins, fluorine based resins, silicon based resins, polycaprolactone, polycarbonate, polyurethane, polyvinyl alcohol, casein, gelatin, and the like. Further, resins such as ionizing radiation-hardened resins or thermally hardened resins, which are capable of being hardened by ionizing radiation or heat, may be employed in combination.

In one embodiment, the reactive diluents are mono and multifunctional acrylates with number average molecular weights of about 226 to about 2000. Examples include tetraethylene glycol diacrylate with a molecular weight of about 302, ethoxylated bisphenol-A diacrylate with a number average molecular weight of about 776 (SR602 from Sartomer Company), trihydroxyethyl isocyanurate triacrylate with molecular weight of about 423 (SR368 from Sartomer), trimethylol propane triacrylate with a number average molecular weight of about 296 (SR351 from Sartomer), and ethoxylated trimethylol propane triacrylates with number average molecular weights from about 400 to about 2000 (SR454, SR499, SR502, SR9035, and SR 415 from Sartomer Company and Photomer 4155 and Photomer 4158 from Henkel Corporation).

C5—Chemical Cure Altering Agents

Such agents include agents that promote or inhibit curing. If the agents promote curing, then UV-curable components in regions including these agents will cure at a faster rate when subjected to the first set of polymerization conditions. If the agents inhibit curing, then UV-curable components in regions including these agents will not fully cure or cure at a slower rate when subjected to the first set of polymerization conditions. Curing can be promoted not only with cure altering agents, but also with different concentrations or types of photoinitiators Photosensitizers and accelerators can include but are not limited to ITX (isopropyl thioxanthone, Aceto), and CTX (chlorothioxanthone), quinones such as camphorquinone, Michler's Ketone (4,4'-bis(dimethylamino)benzophenone, thioxanthone, benzanthrone, triphenyl acetophenone and fluorenone (each of which is available from Aldrich), dimethylethanolamine, methyldiethanolamine, triethanolamine, DMPT (N,N-dimethyl-para-toluidine), MHPT (N-[2-hydroxyethyl]-N-methyl-para-toluidine), ODAB (octyl-para-N,N-dimethylamino benzoate), and EDAB (ethyl-para-N,N-dimethylamino benzoate), TPO, BAPO, each of which is commercially available from Ciba Geigy.

Free radical inhibitors can include but are not limited to N-nitroso-N-phenylhydroxylamine, ammonium salt, tris[N-nitroso-N-phenylhydroxylamine, aluminum salt, p-methoxyphenol MEHQ, hydroquinone and substituted hydroquinones, pyrogallol, phenothiazine, and 4-ethyl catechol. UV absorbers include hydroxyphenyl benzotriazole.

Additional photoinitiators and cure altering agents are described in U.S. Pat. No. 6,130,270 to Ukon et al, the entire disclosure of which is incorporated herein by reference.

C5—Reactive Materials

Reactive materials include amino compounds or isiocyanetes, diisocyanates. Generally the blocked form is preferred as the lamination process has a thermal step which can unblock the isocyanate and allow it to react with amino, amido, and hydroxyl groups in the formulation forming Urethane and urea linkages which add to the flexibility of the formulation. A preferred isicyanate is Desmodur DA (Bayer)

C6—Flatting Agents

Various flatting agent additives are known for adjusting the gloss level of coatings. Examples of flatting agents include finely divided silica, and finely divided organic particles such as Pergopak M-3. Examples of suitable flatting agents are described in U.S. Pat. Nos. 3,943,080, 3,948,839, and 4,263,051, the entire disclosures of which are incorporated herein by reference.

C6—Optional Components

The coating compositions can also include flow additives, thermal stabilizers, light stabilizers, dyes, pigments, optical brighteners, surfactants, plasticizers, defoamers, hard particles, metallic particles, and others as would be obvious to one skilled in the art.

Metallic and/or polymeric particles, hard particles and colored particles can also be added. Hard particles include, but are not limited to, aluminum oxide, quartz, carborundum, glass beads and nanoparticles. Such wear resistant fillers also provide enhanced scratch resistance to the compatibilizer coating when used on an outer surface such as shown in FIG. 1, layer 7.

EXAMPLES

Test cards were made according to FIG. 2 with a white PVC core (layer 20) that was litho printed with a standard Industry UV Vinyl litho Black ink from Gans Ink Co. This ink was known to give good adhesion to the core but poor adhesion to Overlay(layer 10). Overlays of PVC, Polyester (PET) or Polycarbonate all showed almost no adhesion to UV Black. Oversize Cards 25 cm by 12 cm were made with a 25 cm by 7.5 cm stripe Litho UV black to allow both 90 degree peel and impact test to be conducted. All structures were 30 mil thick per ISO standards.

Lamination Conditions

The laminates are manufactured using one of three different lamination techniques: Thermal Platen Lamination, Thermal Roll Lamination and Radiation Lamination. The conditions cited are typical and it is recognized that other conditions may give more optimum results.

All card structures were arranged to give a total thickness of 30 plus/minus 3 mils (0.001"). 90 Degree Peel tests were done per ISO procedures as a quick screen for structural integrity. Additional ISO integrity tests generally tracked peel test results.

Laminate 1

Thermal Platen Lamination Condition: single book of chrome polished steel plates, at 150° C., 13 minutes heat, followed by 13 minutes cool 25° C.

Laminate 2

Thermal Roll Lamination Condition:—Polaroid ID roll laminator Model 0927

Laminate 3

Material is collated through a cold nip while compatiblizer is uncured, followed by Radiation curing: UV Hg lamp 300 w/in speed 61-63 ft/min, 3 passes.

Laminate 4

Laminate 3 followed immediately by Laminate 2.

Example 1

UV102 (FM Group), a formulated UV activated vinyl acrylate copolymer (hard material) concentration of 100% was used as the compatibilizer (FIG. 2, layer 11). Layer 12 was a lithographic print of Gans UV Black ink 100% density over core 20 in a patch of at least 1"×3" to allow for peel tests. Peels were checked over both the UV Black and the unprinted white core. After UV-light exposure the material was brittle. When laminated with uncoated clear PVC overlay under condition Laminate 1 there was no adhesion between layers 10 and 20 for the ISO 90 degree peel test.

All peel data referred to herein are in accordance with this test. These tests were repeated with the overlay changed to Polyester (PET) and Polycarbonate(PC) with similar results.

| LAYER | Composition |
|---|---|
| 10 | Overlay (PVC or Polyester (PET) or Polycarbonate) |
| 11 | Compatibilizer UV 102 |
| 12 | 100% Black UV Ink (full bleed |
| 20 | Core (PVC, PET or PC) |
| 26 | Overlay (PVC or Polyester (PET) or Polycarbonate). |

Example 2

UV103 (FM Group) a formulated UV activated vinyl acrylate copolymer (soft material) concentration of 100% was used as the compatibilizer (FIG. 2, layer 11). After UV-light exposure the material was brittle. When laminated under condition Laminate 1 there was no adhesion between layers #10-#20

| LAYER | Composition |
|---|---|
| 10 | Overlay (PVC or Polyester (PET) or Polycarbonate) |
| 11 | Compatibilizer UV 103 |
| 12 | 100% Black UV Ink (full bleed |
| 20 | Core (PVC, PET or PC) |
| 26 | Overlay (PVC or Polyester (PET) or Polycarbonate). |

Example 3

A mixture consisting of UV102 (FM Group) a UV activated vinyl acrylate copolymer (hard material) concentration of 50% and UV103 (FM Group) a UV activated vinyl acrylate copolymer (soft material) concentration of 50% was used as the compatibilizer (FIG. 2, layer 11). This material will be called UV104-5050

After UV-light exposure the material formed strong film. When laminated immediately with 1.8 mil PVC as Layer 10 under condition Laminate 1 there was 90 degree adhesion over white (10 to 20) and UV black Layer 12 between layers 10 and 20 of 1.9 Newton's/mm approx 4 times the ISO bankcard requirement (0.45 Newton/mm). Impact was over 40 mm/newton.

| LAYER | Composition |
|---|---|
| 10 | Overlay (PVC or Polyester (PET) or Polycarbonate) |
| 11 | Compatibilizer UV 104-5050 |
| 12 | 100% Black UV Ink (full bleed |
| 20 | Core (PVC, PET or PC) |
| 26 | Overlay (PVC or Polyester (PET) or Polycarbonate). |

Example 3.A

The same structures as Example 3 but laminated under condition Laminate 1. After 24 hr storage, there was 90 degree adhesion over white or UV black between layers 10 to 20 of 0.5 Newton/mm (ISO bankcard requirement is 0.45 Newton/mm), but non-uniform zip peel. This perhaps was due to post-cure process.

Example 3.B

The same structures as Example 3 but an additional 5% of curing agent (C5) was added. There was 90 degree adhesion over white or UV black between layers 10 to 20 of 2.4 Newton's/mm more then 5 times the ISO bankcard requirement (0.45 Newton/mm). High adhesion was reached due to combination of UV curing and thermo curing processes.

Example 3C

A mixture consisting of UV102 (FM Group) a UV activated vinyl acrylate copolymer (hard material) concentration of 50% and UV103 (FM Group) a UV activated vinyl acrylate copolymer (soft material) concentration of 50% was used as the compatibilizer (FIG. 2, layer 11). This material will be called UV104-5050.

After UV-light exposure the material formed strong film. When laminated immediately with 1.8 mil PVC as Layer 10 under condition Laminate 4 there was 90 degree adhesion over white (10 to 20) and UV black Layer 12 between layers 10 and 20 of 3.5 Newton's/mm approx 4 times the ISO bankcard requirement (0.45 Newton/mm). Impact was over 40 mm/newton. This showed that the combination of UV cold lamination followed by hot Laminateination improved peel strength.

| LAYER | Composition |
|---|---|
| 10 | Overlay (PVC or Polyester (PET) or Polycarbonate) |
| 11 | Compatibilizer UV 104-5050 |
| 12 | 100% Black UV Ink (full bleed) |
| 20 | Core (PVC, PET or PC) |
| 26 | Overlay (PVC or Polyester (PET) or Polycarbonate). |

Example 4

40% Titanium Dioxide as a white pigment was added To Example 3, UV 104-5050 (55%), with additional photoinitiators from C3 to help through cure the heavily pigmented opaque ink. The ink was screen printed trough 305 us mesh. as layer 10. When laminated with 1.8 mil PVC under condition Laminate 1 there was 90 degree adhesion over white or UV black between layers 10 and 12 of 0.9 Newton/mm approx 2 times the ISO bankcard requirement (0.45 newton/mm).

| LAYER | Composition |
|---|---|
| 10 | Overlay (PVC or Polyester (PET) or Polycarbonate) |
| 11 | Compatibilizer UV 104-5050 + 40% Titanium Dioxide + photoinitiators from C3 |
| 12 | 100% Black UV Ink (full bleed |
| 20 | Core (PVC, PET or PC) |
| 26 | Overlay (PVC or Polyester (PET) or Polycarbonate). |

Example 5

Wink 8600 (FM Group) is a waterbased partially thermoset polyurethane dispersion. A concentration of 100% Wink 8600 was used as the compatibilizer FIG. 2, layer 11. The material was film forming. When laminated with 1.8 mil PVC as Layer 10 under condition Laminate 1 there was 90 degree adhesion over white (10 to 26) and UV black between layers 10 and 12 of 1.9 Newton/mm approx 4 times the ISO bankcard requirement (0.45 Newton/mm). Impact was over 40 mm/newton.

| LAYER | Composition |
|---|---|
| 10 | Overlay (PVC or Polyester (PET) or Polycarbonate) |
| 11 | Compatibilizer Wink 8600 |
| 12 | 100% Black UV Ink (full bleed |
| 20 | Core (PVC, PET or PC) |
| 26 | Overlay (PVC or Polyester (PET) or Polycarbonate). |

Example 5.A

Same as Example 5 except compatibilizer was 95% Wink 8600 (FM Group) and 5% curing agent. This item is called W8600T When laminated with 1.8 mil PVC as Layer 10 under condition Laminate 1 there was 90 degree adhesion over white (10 to 26) and UV black between layers 10 and 12 of 2.3 Newton/mm approx 5 times the ISO bankcard requirement (0.45 Newton/mm). Adhesion increased is due to the thermo curing process.

Example 6

Same as Example 3 except layer 10 was 1.8 mil Polyester (PET Hostaphan, Mitsubishi Corp). When laminated under condition Laminate 1 there was 90 degree adhesion over white (10 to 26) and UV black between layers 10 and 20 it was not possible to delaminate or there was irregular film tear in the PET.

| LAYER | Composition |
|---|---|
| 10 | Overlay 1.8 mil PET Hostaphan |
| 11 | Compatibilizer UV 104-5050 |
| 12 | 100% Black UV Ink (full bleed) |
| 20 | Core (PVC, PET or PC) |
| 26 | Overlay 1.8 mil PET Hostaphan |

Example 7

The same structures as Example 6 but Laminate 2 conditions were used. There was 90 degree adhesion over white or UV black between layers 10 to 20 of 1.9 Newton/mm approx 2 times the ISO bankcard requirement (0.45 Newton/mm). This perhaps was due to the very short heat cycle of Laminate 2 and could perhaps be optimized.

Example 8

The same structures as Example 6 but Laminate 3 conditions were used. There was 90 degree adhesion over white or UV black between layers 10 and 20 of 1.9 Newton/mm approx 2 times the ISO bankcard requirement (0.45 Newton/mm). This perhaps was due to the lack of a heat cycle of Laminate 3 and could perhaps be better optimized by adding additional or different initiators.

Example 9.A

Holographic Foil-Comparative Example

The same structures as Example 3 except that layer 12/20, was a laminate of rigid white PVC and rainbow Holographic aluminum foil made by CFC, Chicago, Ill. With a unknown solvent based print receptor on top of layer 12. 90 degree peel failed between layer 12 and 20 with very low peel strength.

Prior to peel Example 9A was laid next to an rf card that would normally read at a distance of 2-3 inches from the reader. It failed to read until the card was placed 0.5 inches from the reader. This shows that metallic foil over the complete surface of a card can affect the readability due to the conductivity of the foil.

| LAYER | Composition |
|---|---|
| 10 | Overlay 1.8 mil PVC |
| 11 | Compatibilizer UV 104-5050 |

-continued

| LAYER | Composition |
|---|---|
| 12 | Rainbow Holographic aluminum foil |
| 20 | Core (PVC) |
| 26 | Overlay 1.8 mil PVC |

Example 9.B

Holographic Pigment

Wink 8220H3 (FM Group), a waterbased partially thermoset urethane card compatibilizer concentration of 97% urethane with 3% holographic pigment water miscible solvent dispersion (10% pigment solids) similar to pigments described in U.S. Pat. No. 5,624,076 to Miekka was used as the ink FIG. 2 layer 12. The material was film forming. With 1.8 mil PVC as Layer 10. When laminated under condition Laminate 1 there was 90 degree adhesion over white (10 to 20) and UV black between layers H and 20 of 0.9 newtons/mm approx 2 times the ISO bankcard requirement (0.45 newton/mm). Impact was over 40 mm/newton.

Prior to peel Example 9B was laid next to an RF chip card that would normally read at a distance of 2-3 inches from the reader. It continued to read as required. This shows that metallic holographic pigment over the complete surface of a card did not affect the readability due to the lack of conductivity of the ink.

| LAYER | Composition |
|---|---|
| 10 | Overlay 1.8 mil PVC |
| 11 | Compatibilizer Wink 8220 + 3% holographic pigment |
| 12 | 100% Black UV Ink (full bleed) |
| 20 | Core (PVC) |
| 26 | Overlay 1.8 mil PVC |

Example 9.C

The sample is the same as Example 9A except that layer 20 is a white PVC with a magenta ink 19 screen printed on the white PVC. An IXLA 100+ Nd:YAG (neodymium:yttrium-aluminum-garnet) laser, 1064 nm light, power 10 watts laser is used. Power was measured by an Ophir Laser Power detector, model #150C-A-.3-Y. to be 0.25 Watts/square micron. The LD control unit was able to have the laser mark pits in the Rainbow Holographic foil receptor layer 12 in the image of a photograph of a female face. A Magenta face showing layer 19 is formed in the holographic layer with high resolution >1200 dpi. The holographic layer 12 is otherwise not affected and the card has similar physical properties to Example 9A.

| LAYER | Composition |
|---|---|
| 10 | Overlay (PVC or Polyester (PET) or Polycarbonate) |
| 11 | Compatibilizer UV 104-5050 |
| 12 | Rainbow Holographic aluminum foil |
| 19 | Wink 861RRT Compatibilizer Magenta Waterbased Screen Ink |
| 20 | Core (PVC, PET or PC) |
| 26 | Overlay (PVC or Polyester (PET) or Polycarbonate) |

Example 9D

The sample is the same as Example 9B except that layer 11 is a non holographic waterbased ink, Wink SRZ 12R2, a Waterbased metallic magenta tint. This ink was screen printed on the white PVC. An IXLA laser described is used to mark pits in the aluminum receptor layer in the image of a photograph of a female face. A Magenta face is formed in the aluminum reflective ink layer with high resolution >1200 dpi. The aluminum layer is otherwise not affected and the card has similar physical properties to Example 9B.

| LAYER | Composition |
|---|---|
| 10 | Overlay 1.8 mil PVC. |
| 11 | Compatibilizer Wink SRZ12R2 |
| 12 | Core PVC |
| 20 | Core PVC |
| 26 | Overlay 1.8 mil PVC |

Example 9.E

Holographic Transfer Foil Multicolor Printing

Same as Example 3 except that layer 26 was a laminate of rigid white PVC with CMY printed dots with registration marks and rainbow Holographic aluminum hot stamp foil made by Crown Roll Leaf. The adhesive was removed with solvent from the hot stamp foil and was replaced with a layer of Wink 861RT waterbased compatibilizing layer applied by a #4 wire wound rod and dried. The foil was laminated onto the color dot printed white PVC and then the carrier was stripped away. This left a holographic foil over the color dots. This was then laminated with PVC Overlay coated with Wink 861RT. Despite the similarity to Structure 9A, this structure had high cohesive peel strength similar to Example 9B.

| LAYER | Composition |
|---|---|
| 10 | Overlay (PVC) |
| 11 | Compatibilizer Wink 861RT |
| 12 | Rainbow Holographic aluminum foil |
| 13 | Compatibilizer Wink 861RT |
| 19 | RGB printed color dor matrix |
| 20 | Core PVC |
| 26 | Overlay (PVC) |

This structure was laser engraved with the Ixla laser to reveal a 3 color RGB image against a metallic holographic background. The color registration was slightly off due to the lack of a camera or other feedback to allow proper optical registration of the laser image to the RGB color dot matrix.

Example 9F

Same as Example 9E except that the laser power is turned up to 0.7 watts/square micron for the Black K color. A RGBK image is formed Example 9G Same as example 9F except that the laser is imaged to remove the metallic layer not only over the RGB dot matrix but over the non imaged areas (lands) next to the dots reveal-

Example 9G

Same as Example 9D except that layer 12 is a print of Wink SRZ12T in register with the RGB printed dot matrix of layer 19 thereby covering only the dots with a metallic layer. This is then laminated with compatibilized layer 11 overlay layer 12. The structure is similar to Example 9B except that high contrast marks of silver on a white background can be made without laser ablation of the area around the dots as in Example 9G. The layers 20/19/12 can be printed inexpensively with a Litho printer equipped with an in-line Flexo coating station.

| LAYER | Composition |
| --- | --- |
| 10 | Overlay (PVC) |
| 11 | Compatibilizer Wink 861RT |
| 12 | WINK SRZ12T IMAGED |
| 19 | RGB printed color dot matrix |
| 20 | Core PVC |
| 26 | Overlay (PVC) |

Example 10

Multiple Markable Transparent Composition

Wink 3300BC Waterbased PressLaminate coating, a low molecular weight waterbased transparent vinyl dispersion with a phosphate charrant additive used as a D2T2 and laser compatibilizing receptor was serigraph printed, 305 mesh US as layer 11 in FIG. 2. Layer 10 was omitted and the structure was laminated under Laminate 1 conditions except the heat time was reduced to 5 minutes to reduce any possibilities of premature decomposition and increase throughput. The card was printed with D2T2 CMYK ribbon on both Fargo and Datacard machines and gave high contrast prints and readable bar codes. The card was laser marked at low power with various lasers: Nd YAG, diode pumped Nd Vanadate, and Carbon Dioxide lasers and all gave high contrast black marks.

| LAYER | Composition |
| --- | --- |
| 11 | D2T2 Compatibilizer Wink 3300BC Waterbased Press Laminate |
| 20 | Core (PVC, PET or PC) |
| 26 | Overlay 1.8 mil PVC |

Example 10B

Comparative Example

A blank laminated cards white PVC with clear overlay. The card was laser marked at low power with various lasers: Nd YAG, diode pumped Nd Vanadate, and Carbon Dioxide lasers and all gave low contrast marks.

| LAYER | Composition |
| --- | --- |
| 11 | PVC Overlay |
| 20 | Core (PVC) |
| 26 | Overlay 1.8 mil PVC |

Example 11

Polycarbonate Composition

Comparative Example

A 100% polycarbonate card was made consisting of white core and clear overlay and laminated at 170 deg C. for 20 minutes. The card was exposed to a plasticizer DINP per ISO 322-2002 and flex tested per INCITS for SEC 5.6 The card was broken in half after 24 hrs.

| LAYER | Composition |
| --- | --- |
| 11 | Overlay 1.8 mil PC |
| 20 | Core PC |
| 26 | Overlay 1.8 mil PVC |

Example 11B

D2T2 Printable Durable Polycarbonate Composition

Same as Example 11 except that prior to lamination the Polycarbonate overlay was coated with WINK 8207G a waterbased partially thermoset polyurethane dispersion and then coated with Wink 335 Presslam a low molecular weight waterbased transparent vinyl dispersion as a D2T2 receptor. The card was exposed to a plasticizer DINP per ISO 322-2002 and flex tested per INCITS for SEC 5.6. Unlike Example 11 the card did not have any crack after 24 hrs. This shows that chemical durability was added to the card structure. The card was printed with D2T2 CMYK ribbon on both Fargo and Datacard machines and gave high contrast prints and readable bar codes.

| LAYER | Composition |
| --- | --- |
| 9 | Layer of Wink 335 Presslam - a low molecular weight water based transparent vinyl dispersion as a D2T2 receptor. |
| 10 | Layer of WINK 8207G a water based polyurethane composition |
| 11 | Overlay 1.8 mil PC |
| 20 | Core PC. |
| 26 | Overlay 1.8 mil PC. |

Example 11C

Laser markable and D2T2 Printable Durable Polycarbonate Composition

Same as Example 11B except that prior to lamination the Polycarbonate overlay was a Bayer laserable grade Polycarbonate. The card was exposed to a plasticizer DINP per ISO 322-2002 and flex tested per INCITS for SEC 5.6. Unlike Example 11 the card did not have any crack after 24 hrs. This shows that chemical durability was added to the card structure. The card was printed with D2T2 CMYK ribbon on both Fargo and Datacard machines and gave high contrast prints and readable bar codes. The card was laserable with a NdYag laser and gave high contrast black marks.

| LAYER | Composition |
|---|---|
| 9 | Layer of Wink 335 PressLaminate - a low molecular weight waterbased transparent vinyl dispersion as a D2T2 receptor. |
| 10 | Layer of WINK 8207G a water based polyurethane composition |
| 11 | Overlay 1.8 mil PC |
| 20 | Core PC. |

Example 12

Combination of UV Light Exposure and Thermal Lamination

The degree of transparency of a laminate can, for example, be dictated by the information contained on the core layer, the particular colors and/or security features used. Lamination of any laminate layer(s) to any other layer of material (e.g., a core layer) can be accomplished using a conventional lamination process, and such processes are well known to those skilled in the production of articles such as identification documents. Of course, the types and structures of the laminates described herein are provided only by way of example, those skilled in the art will appreciate that many different types of laminates are usable in accordance with the invention.

The material(s) from which a laminate is made may be transparent, but need not be. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Dimensions of an ID document will vary according to specified design requirements. For example, applicable International Organization for Standardization (ISO) specifications for identification documents may specify required dimensions. Within specified dimensions there is some dimension play. In one implementation, we provide a core including an 4-20 mil depth, compatibilisers with a 0.2-7 mil depth, and overlay laminate layers ranging from 1-15 mils.

In some implementations we provide a matte finish on a top surface of the back laminate layer. The matte finish helps to feed the laminate layer if provided in roll form. The matte finish may also provide a tactile security feature, as an inspector can feel the texture of the card (e.g., a matted finish) to determine if the card is legitimate.

And while we have described certain materials and dimensions for our contactless smart identification documents the present invention should not be limited to such. Indeed, the present invention includes many more contactless smart identification documents of different dimensions and materials.

It may be advantageous to coat the image-receiving material at a centralized production facility and then provide resultant blank documents to a plurality of document issue stations (OTC stations) at which variable data is applied to the image-receiving layers of the identification documents.

Following the printing of information on an image-receiving layer (if provided, otherwise after printing on the PET layer), a protective layer (not shown) is optionally affixed over at least a portion of the image-receiving layer. The protective layer serves to protect the relatively fragile image-receiving layer from damage, and also prevents bleeding of information (e.g., thermal transfer dye) from the image-receiving layer. Materials suitable for forming such protective layers are known to those skilled in the art of dye diffusion thermal transfer printing and any of the conventional materials may be used provided that they have sufficient transparency and sufficient adhesion to the specific image-receiving layer with which they are in contact and/or block bleeding of dye from this layer. However, in keeping with the theme of this aspect of the present invention, we preferably apply a transparent PET-based protective laminate, if used.

The protective layer may optionally provide additional security and/or features for the identification document. For example, the protective layer may include a low cohesivity polymeric layer, an optically variable ink, variable information, an image printed in an ink which is readable in the infra-red or ultraviolet but is invisible in normal white light, an image printed in a fluorescent or phosphorescent ink, cohesive failure ink, or any other available security feature which protects the document against tampering or counterfeiting, and which does not compromise the ability of the protective layer to protect the identification document against wear and the elements.

In at least one embodiment (not shown), laminate layers are formed into a pouch into which the core layer slips. With a pouch, methods such as heat, pressure, adhesives, and the like, are usable to bond the core layer to the pouch laminates. Those skilled in the art will appreciate that many known structures and configurations for laminating are usable with the invention.

It is believed by the inventors that the mechanism of intumesceance is involved in the laser marking of materials. The requirements therefore are that sufficient heat absorption is required to intumesce or char the material. This is achieved by the absorption of laser energy. For the polymeric material to absorb the energy it must have a spectral absorbance in the wavelength region of the laser. Many different lasers at various wavelengths and power are available. The most popular for laser marking are diode pumped Neodymium Vanadate, Neodymium YAG, and Carbon Dioxide.

Materials that absorb at the respective wavelengths but are transparent in the visible are also available such as IR transparent dyes such as those made by Epolin Inc.

NIR Dyes for Solventborne Coatings

EPOLIGHT (Epolin, Inc)

| Narrow band absorbers | | |
|---|---|---|
| 4037 | 743 | platinum dithiolene |
| 3036 | 773 | nickel dithiolene |
| 3211 | 785 | nickel dithiolene |
| 3442 | 817 | nickel dithiolene |
| 3443 | 868 | nickel dithiolene |
| 3116 | 892 | nickel dithiolene |
| 2067 | 905 | tris amminium |
| 2063 | 906 | tris amminium |
| 2177 | 976 | tris amminium |
| 2062 | 977 | tris amminium |
| 2066 | 978 | tris amminium |
| 2057 | 990 | tris amminium |
| 2189 | 990 | tris amminium |
| 2180 | 991 | tris amminium |
| 2164 | 993 | tris amminium |
| 1151 | 1070 | tetrakis amminium |
| 1117 | 1071 | tetrakis amminium |
| 1178 | 1073 | tetrakis amminium |
| 3045 | 1097 | nickel dithiolene |

| Broad band absorbers | | |
|---|---|---|
| 1175 | 948 | tetrakis amminium |
| 1125 | 950 | tetrakis amminium |
| 1130 | 960 | tetrakis amminium |

Others such as the Cyanines are particularly useful because of their absorption in the near IR where the YAG and Vanadate laser lines are situated.

Polymers are known to decompose and char under thermal load. This is particularly true of low molecular weight polymers for which there are many stabilizing additives. See review of *Decomposition Mechanisms and Thermal Stabilizers* in as cited in Plastic Additives, R. Gachter and H. Muller, Eds., Hauser/MacMillan, New York, 1988, 754. Typically thermal stabilizers are used to allow these materials to be processed.

The inventors believe by using unstabilized or partially stabilized materials that are applied as inks or coatings at low temperatures compared to their decomposition point and not be subjected to extreme thermal stress could be laser marked. These materials in conjunction with char formers and laser wavelength absorbers tuned to the laser absorbing wavelength, or broad spectrum absorbers like carbon black at low levels it will be possible to make a laser markable transparent composition.

In addition for the identification card market the laser markable composition should also fit into the requirements of the card structure and pass the various ISO tests. One needs to consider that some intumescent structures foam. This may be desirable in that it would cause the indicia to be raised giving a tactile feature to the ID card, it might be able to replace the emboss feature of some cards. However the gassing is not always controlled and can blur the indicia image. Tactile features on the surface also can be subject to greater wear due to abrasion of the raised image. It is therefore desirable to make high contrast laserable indicia without gassing. Thus one would like to control the gassing independent of the charring.

If the laser markable material that is markable at multiple wavelengths is combined with materials that accept D2T2 printing as well as inkjet printing, a desirable multiple markable material is produced.

Various low molecular weight monomers, oligomers and polymers in water based, solvent based and radiation cured forms with char formers added with both broad based and selective radiation absorbers can achieve laser marking with high contrast using either diode laser pumped Neodymium Vanadate, Nd Yag laser and Carbon Dioxide laser.

The particular combinations of elements and features in the above-detailed embodiments are exemplary only; the interchanging and substitution of these teachings with other teachings in this and the incorporated-by-reference documents are also expressly contemplated.

The concepts of this invention can be used in a smart identification document comprising:

a core layer including a first surface and a second surface, the core layer comprising a first material:

a first layer of a substantially transparent polymer adjacently arranged on and fixedly attached to the first surface of the core layer to form a document structure having first and second surfaces, where the substantially transparent polymer of the first layer comprises a material that is substantially different than the first material;

wherein at least one of the first surface of the core layer, first surface of the document structure, second surface of the document structure, and the second surface of the core layer bears at least one printed indicia thereon and the layer of substantially transparent polymer comprises a compatibilizing layer.

Optionally, at least one of the first surface of the core layer and the compatibilizing layer comprises indicia thereon. The indicia includes biometric information such as a photographic representation of a human subject, a human fingerprint or prints.

The core layer can be at least one of a porous synthetic material, a polymer, a synthetic or nonsynthetic paper, a polyolefin, a silica-filled polyolefin, polyvinyl chloride, polycarbonate, amorphous and biaxially oriented polyester terpthalate and polyester napthanate, glycol modified polyester, styrene, high impact polystyrene, acrylonitrile styrene butadiene, acrylic, polyketone, cellulose ester, polysulfone, polyamide, polycarbonate.

The first layer may be a substantially transparent polymer that is adjacently arranged on the first surface of the core layer comprises at least one of a nonporous synthetic material, a polymer, a synthetic or nonsynthetic paper, a polyolefin, a silica-filled polyolefin, polyvinyl chloride, polycarbonate, amorphous and biaxially oriented polyester terpthalate and polyester napthanate, glycol modified polyester, styrene, high impact polystyrene, acrylonitrile styrene butadiene, acrylic, polyketone, cellulose ester, polysulfone, polyamide, polycarbonate.

The core layer can be microporous porous TESLIN or LUPO synthetic polyolefin.

The core layer can be nonporous or porous PVC, PET, or Polycarbonate.

The core layer can be paer or board such as passport paper or cover paper.

The first layer of the substantially transparent polymer that is adjacently arranged on the first surface of the core layer includes a front surface and a back surface, the front surface being the surface that is adjacently arranged on the first surface of the core layer, and wherein the front and or back surface have a receptor coating being markable by multiple means such as laser, inkjet, dye diffusion thermal transfer, hot stamping, embossing, gravure, lithographic, flexographic, screen, liquid toner reprographic, solid toner reprographic printing.

The identification document may be milled to form a cavity to house a contact-type smart card module.

This invention may be used in documents containing smart card modules. Such modules are produced by milling a cavity in an identification document to receive a smart card module. Such a document comprises at least a laminate layer-document core sandwich structure, wherein the laminate layer comprises a substantially different material than does the document core, said method comprising:

providing a first cut in the laminate layer to create a rough upper cavity, the rough upper cavity including a first aperture;

providing second cut to create a lower cavity, the lower cavity extending through the laminate layer into the document core, the lower cavity and the rough upper cavity being approximately centered on a common axis, wherein the aperture of the lower cavity is relatively smaller than the aperture of the rough upper cavity resulting in a shelf in the laminate layer; and providing a third cut around the rough upper cavity to create a finished upper cavity, the finished upper cavity having an aperture, which is larger than the aperture of the rough upper cavity, the finished upper cavity being approximately centered on the common axis. The first second, and third cuts are cut so that a portion of the smart card module to be received will substantially float within at least one of the upper and lower cavities.

The invention may be used in producing a contactless smart identification card. Such cards are produced by:

providing a carrier layer including at least a transceiver and electronic circuitry, wherein the carrier comprises at least one permeable area;

arranging the carrier layer between a first contact layer and a second contact layer, and then securing the first contact layer and second contact layer to the carrier layer through at least one of heat, pressure, and radiation so that at least a portion of one of the first contact layer and the second contact layer migrates into the carrier layer at the one permeable area; and providing a laminate layer over at least the first and second contact layers.

What is claimed is:

1. A secure personalized laser markable laminated RF identification document for recording a predetermined identification image and an electromagnetic signature thereon, the identification document comprising a compatibilising layer, bonded on each surface of the compatibilizing layer to an adjoining laminate layer, at least one of which is an image receiving laminate layer, the compatibilizing layer including on at least one surface an imaging material that can be laser marked with laser radiation at power densities less than about 1 watt/micron to form the predetermined identification image and maintain cohesive bonding with the adjoining laminate layers, wherein the adjoining image receiving laminate layer overlaying the surface that includes the imaging material is a conducting or a semiconducting material that is opaque or partially opaque, and is absorbent to the laser radiation and after exposure to the laser radiation the image receiving laminate layer becomes transparent and the laser radiation forms an antennae on the image receiving laminate layer with an electromagnetic signature which is RF readable.

2. The identification document claim 1 wherein the compatibilizing layer comprises a polymer selected from the group consisting of water based curable polymers or radiation curable polymers that can be partially or fully thermoset, or mixtures thereof.

3. The identification document of claim 1, wherein the compatibilizing layer has a transparency in the visible region of about 400-800 nm and absorbency for the laser radiation.

4. The identification document of claim 1, wherein the compatibilizing layer has a high reflectivity in the visible region of 400-800 nm and absorbency for the laser radiation.

5. The identification document of claim 1, wherein the compatibilizing layer can be a recording media which is a opaque or partially opaque.

6. A secure personalized laminated RF identification document for recording a predetermined identification image and electromagnetic signature thereon, comprising:

a core laminate layer having an upper surface and lower surface, at least one surface of which is printed with a dot matrix pattern wherein the dots have non-imaged are adjacent the dots, wherein the core laminate includes at least one compatibilizing layer bonded on each surface of the compatibilizing layer to an adjoining laminate layer, the compatibilizing layer including on at least one surface an imaging material that can be laser marked with the laser radiation at power densities less than about 1 watt/micron to form the identification indicia image while maintaining cohesive bonding with the adjoining laminate layers, wherein the adjoining laminate layer overlaying the surface including the imaging material is laser transparent to the laser radiation;

and at least one visually opaque or reflective image receiving laminate layer that is a conducting or semiconducting material that can be pitted with laser radiation, bonded to and overlaying the at least one surface printed with the dot matrix pattern; wherein upon pitting the image receiving laminate layer with the laser radiation, portions of the dot matrix pattern, printed on the core laminate are exposed to thereby form the predetermined identification image and the remaining land areas of the laminate form an antennae with an electromagnetic signature which is RF readable.

7. The identification document of claim 6, wherein the compatibilizing layer comprises a polymer selected from the group of water based curable polymers or radiation curable, polymers that can be partially or fully thermoset, or mixtures thereof.

8. The identification document of claim 6, wherein the compatibilizing layer has a transparency in the visible region of about 400-800 nm and absorbency for the laser radiation.

9. The identification document of claim 6, wherein the compatibilizing layer has a high reflectivity in the visible region of 400-800 nm and absorbency for the laser radiation.

10. The identification document of claim 6, wherein the compatibilizing layer can be a recording media which is opaque or partially opaque.

11. The identification document of claim 6, wherein the dot matrix pattern comprises a plurality of different color dots.

12. The identification document of claim 6, wherein the dot matrix pattern is printed as full screen dots.

13. The identification document of claim 6, wherein the opaque or reflective laminate layer includes another identifying indicia printed thereon.

14. The identification document of claim 6, further comprising a compatibilized layer between the visually opaque or reflective laminate layer and the core laminate layer to thereby bond such laminate layers to each other.

15. The identification document of claim 6, further comprising a biometric identification indicia.

16. The identification document of claim 6, further comprising a smart card module embedded in the document in communication with the antennae.

17. The identification document of claim 6, further comprising an other laminate layer overlaying the image receiving laminate layer, wherein such other laminate layer is transparent to laser radiation and through which the predetermined identification image can be viewed.

* * * * *